April 6, 1954 E. H. STERN 2,674,139
SPACING TABLE
Filed Jan. 25, 1952 2 Sheets-Sheet 1

INVENTOR.
EDWIN H. STERN
BY
Zugelter & Zugelter
Attys.

April 6, 1954
E. H. STERN
2,674,139
SPACING TABLE
Filed Jan. 25, 1952
2 Sheets-Sheet 2
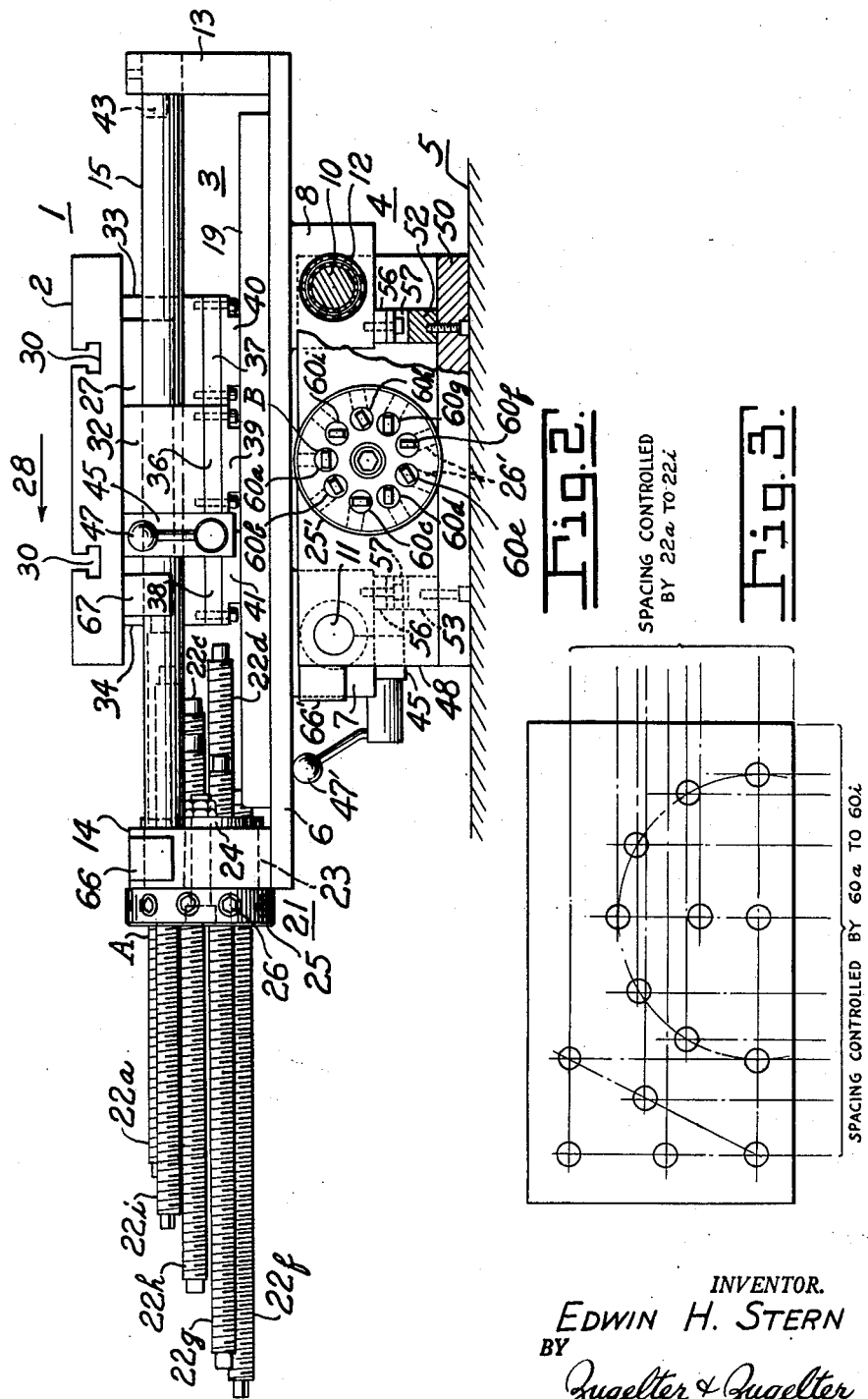
INVENTOR.
EDWIN H. STERN
BY
Zugelter & Zugelter
Attys.

Patented Apr. 6, 1954

2,674,139

UNITED STATES PATENT OFFICE 2,674,139

SPACING TABLE

Edwin H. Stern, Cincinnati, Ohio, assignor to Acorn Tool & Mfg., Inc., Cincinnati, Ohio, a corporation of Ohio Application January 25, 1952, Serial No. 268,257

5 Claims. (Cl. 77—63)

This invention relates to work holders for machine tools having a spindle for driving drills, boring tools and reamers, for example, and more particularly to a spacing table on which a piece of work may be mounted and by means of which the spacing and pattern of holes in the workpiece may be duplicated time after time without the employment of a jig.

An object of this invention is to provide a simple, accurate and relatively inexpensive spacing table for machine tools for drilling, boring and reaming, for example, by means of which any predetermined pattern of holes that may be plotted in rectangular coordinates in a single plane, may be duplicated time after time in workpieces without limit as to the number of duplications.

A further object of the invention is to provide a spacing table which is so arranged and constructed that the pattern of holes in a single work piece or series of workpieces may be adjusted at will.

A still further object of the invention is to provide a spacing table which is so constructed that a workpiece mounted thereon may be moved in two directions at right angles to each other, the table being provided with a plurality of stops whereby the amount of controlled movement in either of said directions may be preset, thereby to provide for the location of points in the workpiece that conform to a pattern which can be plotted in rectangular coordinates.

A further object of the invention is to provide a spacing table that can be used to check the accuracy of manufactured parts where the dimensions to be checked can be expressed in rectangular coordinates.

The above and other objects of the invention will be apparent to those skilled in this art from the following description taken in conjunction with the accompanying drawings in which:

Fig. 2 is a view in side elevation (as seen looking from right to left in Fig. 1) of the spacing table, a portion of the table being in section taken on line II—II of Fig. 1; and Fig. 3 is a view of a workpiece illustrating a typical pattern of holes that may be drilled, bored or reamed in a piece and duplicated in other work pieces.

Figure 1:
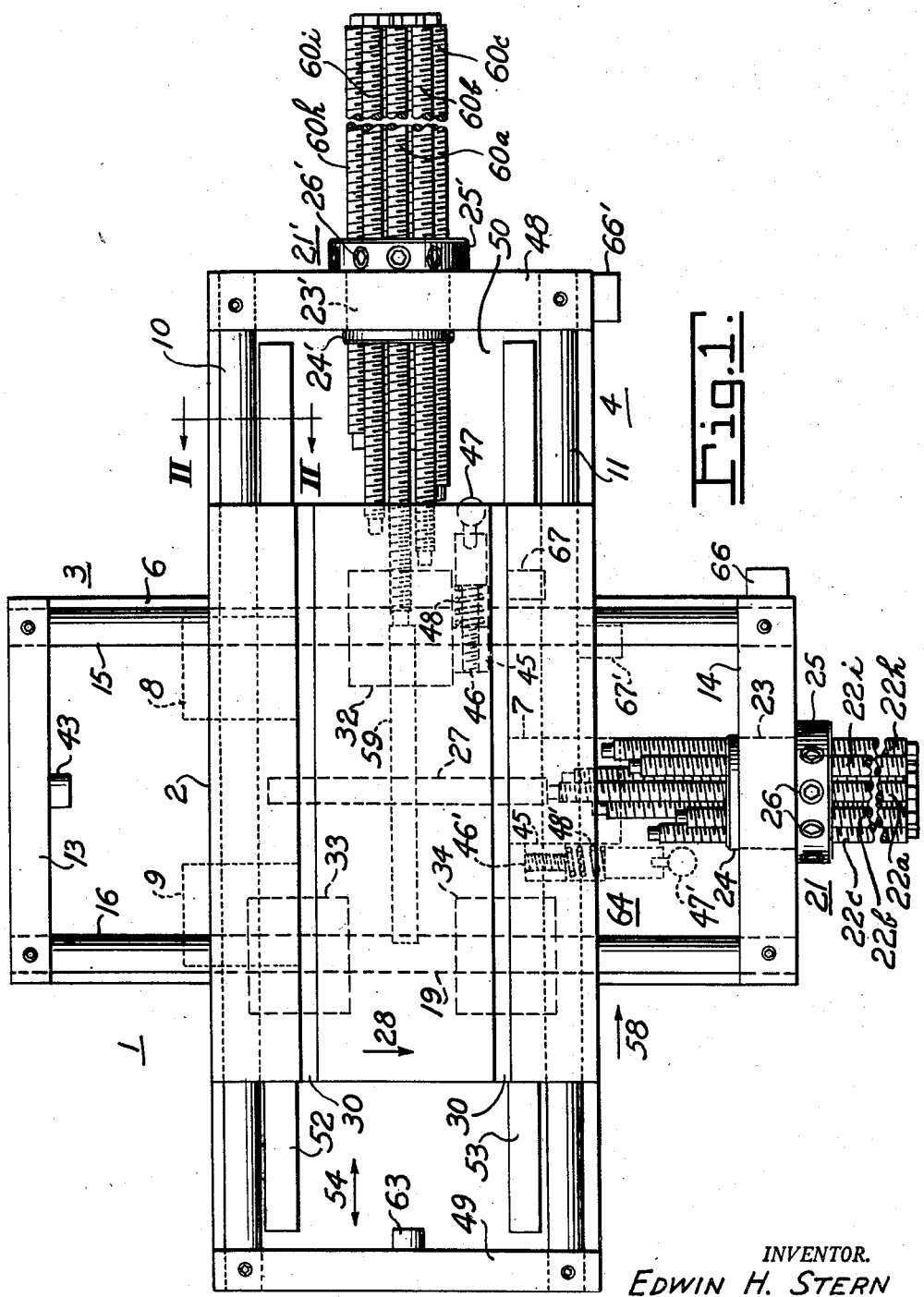
Figure 1 is a top plan view of a spacing table arranged and constructed in accordance with an embodiment of the invention.

With reference to Figs. 1 and 2 of the drawings, a work holder or spacing table 1 is shown that comprises a workpiece supporting table 2, a carriage 3 and a base carriage 4 on which carriage 3 is mounted. The spacing table 1 is adapted to be mounted on and secured to a platform 5, such as the bed of a machine tool provided with a spindle for driving a drill, boring tool, or reamer, for example.

The spacing table shown is adapted to perform duplicating work, as for example, in a case where the job is to drill, bore or ream holes in a large number of similar workpieces in which the location and spacing of the holes are to be identical in pattern. The spacing table is set up to duplicate that pattern, and the spacing table is provided with means whereby it may be preset to accomplish the pattern duplicating function as will be described infra.

Since, as above described, carriage 4 rests on the machine bed or platform and carriage 3 is located between the work supporting table and carriage 4, carriage 3 will be referred to as the intermediate carriage and carriage 4 as the base carriage.

Intermediate carriage 3 comprises a base 6 having blocks 7, 8 and 9 depending from the lower face thereof and spaced to form an isosceles triangle. Blocks 8 and 9 are located on the base of the triangle and block 7 at the apex. These blocks are bored to accommodate guide rods 10 and 11 mounted on the base carriage 4. Each block 7, 8 and 9, may be provided with anti-friction bearings, such as ball bearings, illustrated at 12 in Fig. 2.

To upper face of bed 6 end frame members 13 and 14 are secured. The ends of a pair of guide rods 15 and 16 are secured to end frame members 13 and 14. Also on the upper face of bed 6 are mounted thrust rails 19 to which is transmitted the work load imposed on the workpiece and the spacing table when a vertical thrust results from work being performed on the work piece.

End frame member 14 of carriage 3 is provided with a rotatable head 21 that carries a plurality of adjustable stop gauges 22a to 22i, both inclusive. The stop gauges 22a–22i, are uniformly spaced about the circumference of a circle which is concentric with the axis of rotation of the head 21. As shown, the head 21 comprises a spindle 23 journaled in end frame 14, and having at the inner end thereof a flange 24 and at the outer end a flange 25, whereby the head is secured against longitudinal movement through the bore in frame member 14. Flange 25 is provided with a plurality of set screws 26, one for each stop gauge, whereby when each gauge has been adjusted to its proper position it may be securely locked in that position. The stop gauges 22a to 22i are adjusted so that their inner ends which are blunt and square, that is, at right angles to the longitudinal axis of the gauges, will, when the active gauge abuts abutment 27, limit the movement of the work holder 2 in the direction of arrow 28 (see Fig. 2). The mounting of the stop gauges 22a–22i is such that the one which is located at position A in Fig. 2 being at the highest point, is the one which engages the work table 2 to stop the work table at the proper position when moved in the direction of arrow 28.

Work table 2 is in form like a typical work holder and is provided with T slots 30 by means of which conventional clamp bolts may be anchored in the work holder and to the workpiece to securely hold it in position on the work table. From the lower face of the work table a plurality of blocks 32, 33 and 34 depend. These blocks are so spaced that they lie at the corners of a triangle with blocks 33 and 34 at the base of such triangle. On the lower faces of blocks 32, 33 and 34 are spacers or shims 36, 37 and 38 and wear pieces 39, 40 and 41, the wear pieces and spacers being secured by means of screws or bolts, as shown, to the underfaces of the blocks 32, 33 and 34. The wear pieces 39, 40 and 41 engage thrust rails 19 when a tool is exerting a downward thrust on the workpiece.

Blocks 32, 33 and 34 are bored to accommodate the guide rods 15 and 16 and are provided with anti-friction bearings such as bearing 12 shown in Fig 2, through which the guide rods pass. As shown in Fig. 2, the under part of the work holder 2 is provided with an abutment 27 that abuts the active stop gauge when the work table is moved along guide rods 15 and 16 in the direction of arrow 28. The active gauge stop is the one occupying the highest vertical position at any time.

As shown in Fig. 2, the work table 2 is slideable on guide rods 15 and 16 in either direction between end frame members 13 and 14. To minimize the jar of impact of the work holder 2 with end frame 13, the end frame 13 may be provided with a resilient bumper or cushion 43.

When the work holder table 2 has been adjusted against a stop gauge it should be locked against the stop gauge. In order to provide for locking the table in any position to which it is adjusted while moving in the direction of arrow 28, a split clamp 45 is provided. Clamp 45 is adjacent block 32 and embraces guide rod 15. The clamp may be released or tightened on the guide rod by means of a screw 46 to which a handle 47 is connected. A spring 48 may be provided for opening the clamp to release its grip from the guide rod 15 when the handle 47 is turned in the release direction.

The thickness of shims 36, 37 and 38 is so selected that when the work table 2 is work-load free the work holder 2 and the workpiece thereon will be carried freely on the guide rods 15 and 16 to facilitate ease of movement from one position to another along the guide rods, but when a work-load is imposed on the workpiece the guide rods will deflect only slightly before the pads 39, 40 and 41 solidly engage the thrust rails 19. In other words, the clearances are such that substantially no deflection or bending load is placed on the guide rods 15 and 16.

The base carriage 4 is substantially identical in construction with the intermediate carriage 3. The guide rods 10 and 11 on the base carriage are anchored in end frame members 48 and 49 that are secured to the bed 50 of the carriage. On bed 50, thrust rails 52 and 53 are mounted. These rails take the work-load imposed on the work table when the carriages have been adjusted against their respective active stops. The blocks 7, 8 and 9 which depend from bed 6 of the intermediate carriage 3 are provided with shims 56 and wear pieces 57 all bolted to the underside of the blocks 7, 8 and 9 in the same manner as the shims 36, 37 and 38 and the wear pieces 39, 40 and 41 are secured to the under faces of blocks 32, 33 and 34 as above described.

The work holder 2 and the intermediate carriage 3 are movable as a unit in either direction between end frame members 48 and 49 as indicated by arrow 54 in Fig. 1. The limit of movement of the work table 2 and the intermediate carriage 3 as a unit on guide rods 10 and 11 in the direction of arrow 58 is limited by one of a plurality of stop gauges 60a to 60i, inclusive. In any position, the movement of the work table 2 and its intermediate carriage in the direction of arrow 58 is limited or arrested when the stop gauge which occupies position B in Fig. 2 engages abutment 59, that gauge being the active gauge and the one occupying the highest point as the stop gauges are rotated from one position to another. The stop gauges 60a to 60i are mounted in a head similar in construction to the head 21 described in connection with the intermediate table 3. Therefore, similar and corresponding parts will be designated by the same reference characters with primes affixed.

In order that the shock of impact of the intermediate carriage with the end frame 49 may be reduced and minimized, a bumper 63 of resilient material is secured to the inside face of end frame member 49.

In order that the work holder 2 and the intermediate carriage 3 may be locked in any adjusted position in the direction of arrow 58, a clamp 64 is provided. This clamp is located adjacent to block 7 and embraces guide rod 11. It is similar in construction to the clamp associated with guide rod 15. Therefore, similar and corresponding parts will be designated by the same reference characters with primes affixed.

In order that the gauge stops may be accurately set when a duplicating job is to be set up, the intermediate carriage and the work table 2 are provided with gauge blocks 66 and 67 and that base carriage and intermediate carriage are provided with gauge blocks 66' and 67'. A rule or gauge is placed over these blocks for each spacing of a hole to be drilled, reamed or bored when the work holder 2 is moved in the direction of arrow 28. When the spacing between these blocks has been measured, the gauge head is rotated until the active gauge stop for that position is in the position A after which that gauge stop is turned inwardly until the inner end thereof abuts the abutment 27 of the work holder table 2. The gauge is then locked in position.

The work holder is then rotated one gauge stop spacing and the measurement of the next hole is determined by means of a gauge or rule or "Jo blocks" and the blocks 66 and 67. The gauge stop for that position is then turned until it abuts abutment 27 of the work table, as in the preceding adjustment, whereupon it is locked in position. This procedure is continued until all of the gauge stops have been adjusted to their proper positions. In making these settings of the gauge stops it will be understood that when a workpiece is on the work table, the gauges are set and locked in accordance with a dimensioned drawing.

By use of gauge blocks 66' and 67' the gauge stops 60a to 60i on the base carriage may be properly adjusted.

From the above description it will be seen that the work holder is so constructed that any pattern of holes may be duplicated in similar workpieces time after time by moving the work holder 2 on the intermediate carriage 3, and by moving the intermediate carriage 3 and work holder 2 as a unit, on the base carriage 4 in accordance with the pattern provided by the gauge stops 22a to 22i, and 60a to 60i. The construction is such that any pattern that may be plotted in rectangular coordinates may be effected. For example, as shown in Fig. 3, the holes may be duplicated in a pattern that is a right angle, a straight line, a curved line, or the holes can be drilled on the pattern or circumference of a circle.

Work may be duplicated by means of the spacing table above described with a high degree of accuracy.

The spacing table may also be used to check parts as for example cams, to determine whether the various points on the cam are in accordance with a given design, as the location of such points can be checked by rectangular coordinate plotting. Such plotting can be checked by the gauge stops of the spacing table herein disclosed.

From the foregoing description it will be apparent to those skilled in this art, that the illustrated embodiment of the invention may be modified and changed without departing from either the spirit or the scope of the invention.

Therefore, what is claimed as new and desired to be secured by Letters Patent is:

1. A spacing table for a machine tool comprising a plurality of relatively movable table members, one of said table members being provided with guide rails and adapted to be secured to the bed of a machine tool, a second one of said table members being provided with rigid load-supporting members through which the guide rails of said first mentioned table member extend, whereby said second table members may be moved to and fro on said first table guide rails, said second table member being provided with guide rails that are parallel with and extend at right angles to the guide rails of said first mentioned table member, a third one of said table members being provided with rigid load-supporting members through which the guide rails of said second table member extend whereby said third table member may be moved to and fro on the guide rails of said second table member, each of said first and second table members being provided with means for engaging and selectively positioning the second and third table members with respect to each other and with respect to said first table member.

2. A spacing table according to claim 1 in which the first table member is provided with rigid load-supporting thrust rails disposed adjacent and parallel to the guide rails thereof, that a pair of the load-supporting members is disposed to bear on one of said thrust rails and another of said load-supporting members is disposed to bear on the other thrust rail, whereby the second table member has three point support on the first table member the points of support being so located as to form a triangle the base of which is on one of said thrust rails and the apex of which is on the other thrust rail, the second table member being provided with a rigid load-supporting thrust rail disposed adjacent and parallel to the guide rails thereon and that a pair of the load-supporting members of the third table member is disposed to bear on one of the thrust rails of the second table member and another load-supporting member of said third table member disposed to bear on the other thrust rail of said second table member, the points of support being so arranged that the third table member has three point support on the second table member, two of said points being on one thrust rail and forming the base of a triangle and the other point being on the other thrust rail and forming the apex thereof.

3. A spacing table for a machine tool for effecting duplicating operations comprising a base carriage adapted to be secured to the machine tool table, said base carriage having thrust rails thereon and spaced parallel guide rails, a second carriage having on the underside thereof load supporting blocks arranged to bear on the thrust rails, said load supporting blocks having bores through which said guide rails extend, said rails supporting the second carriage when workload free, thrust rails on said second carriage, spaced parallel guide rails on said second carriage and disposed at right angles to the guide rails on the base carriage, a work holder table on said second carriage, said table having load supporting blocks on the under side thereof disposed to rest on the thrust rails of the second carriage when a work-load is imposed on the work holder table, said table blocks being bored to receive the guide rails of said second carriage, a plurality of independently adjustable stop gauges on the base carriage disposed to selectively engage the second carriage to limit and arrest movement of the second carriage and work table in one direction on the guide rails of the base table, and a plurality of independently adjustable stop gauges on the second carriage disposed to selectively engage and limit and arrest movement of the work table in one direction on the guide rails of said second table.

4. A spacing table according to claim 3 characterized by the fact that the bores of the load supporting block of the second carriage and the work table are provided with anti-friction bearings through which the guide rails of the base and second carriages extend.

5. A spacing table according to claim 3 characterized by the fact that the base carriage is provided with frame members adjacent the ends thereof in which the ends of said base carriage guide rails are secured, that the stop gauges are mounted in means journaled in one of said end frame members, and that said mounting means comprises a spindle journaled in the said end frame member and that the stop gauges are elongated screw-threaded members having threaded engagement with the spindle, the gauges being spaced with their axes parallel to and concentric with the axis of rotation of said spindle, and that the second carriage is provided with end frame members in which the ends of the guide rails thereof are secured, and that one of said end frame members is provided with stop gauges and mounting means of construction substantially like the stop gauges and the mounting means thereof of the base carriage as above set forth.

References Cited in the file of this patent

UNITED STATES PATENTS

| Number | Name | Date |
|---|---|---|
| 2,370,286 | Berger | Feb. 27, 1945 |
| 2,473,506 | Bullard | June 21, 1949 |